United States Patent
Rakshit et al.

(10) Patent No.: US 11,244,080 B2
(45) Date of Patent: *Feb. 8, 2022

(54) PROJECT CONTENT FROM FLEXIBLE DISPLAY TOUCH DEVICE TO ELIMINATE OBSTRUCTION CREATED BY FINGER

(71) Applicant: INTERNATIONAL BUSINESS MACHINES CORPORATION, Armonk, NY (US)

(72) Inventors: Sarbajit K. Rakshit, Kolkata (IN); John M. Ganci, Jr., Raleigh, NC (US); Martin G. Keen, Cary, NC (US); James E. Bostick, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 21 days.

This patent is subject to a terminal disclaimer.

(21) Appl. No.: 16/154,763

(22) Filed: Oct. 9, 2018

(65) Prior Publication Data

US 2020/0111394 A1     Apr. 9, 2020

(51) Int. Cl.
*G06F 21/84* (2013.01)
*G09G 3/00* (2006.01)
(Continued)

(52) U.S. Cl.
CPC .............. *G06F 21/84* (2013.01); *G06F 3/041* (2013.01); *G06F 21/62* (2013.01);
(Continued)

(58) Field of Classification Search
CPC .......... G09G 3/002; G09G 5/14; G09G 5/377; G09G 2354/00; G09G 2358/00;
(Continued)

(56) References Cited

U.S. PATENT DOCUMENTS 6,340,957 B1   1/2002  Adler et al.
6,943,774 B2   9/2005  Horiki
(Continued)

FOREIGN PATENT DOCUMENTS

EP         2541386         1/2013

OTHER PUBLICATIONS

Pending U.S. Appl. No. 15/982,391, filed May 17, 2018, entitled: "Projecting Obstructed Content Over Touch Screen Obstructions" 33 pages.

(Continued)

*Primary Examiner* — Carolyn R Edwards
*Assistant Examiner* — Eboni N Giles
(74) *Attorney, Agent, or Firm* — John Noh

(57) ABSTRACT

A method is provided. The method may include displaying content on a touch screen of the computing device, wherein the touch screen comprises a flexible touch screen display, detecting an obstruction of the content on one or more areas of the touch screen, wherein a user's view of the content is obstructed by the obstruction, determining obstructed content in the areas based on the detected obstruction, and determining a display configuration for a portion of the obstructed content. The method may further include detecting a deformed condition of the touch screen in which the obstruction is positioned within a display angle of the image projection device, rendering display content for concurrent display with unobstructed content of the touch screen, wherein the rendered display content corresponds to the obstructed content, and projecting the rendered display content onto the obstruction for viewing in superposition within a user's field of view.

20 Claims, 8 Drawing Sheets

(51) Int. Cl.
*G06F 3/041* (2006.01)
*G06K 9/00* (2006.01)
*G09G 5/14* (2006.01)
*G09G 5/377* (2006.01)
*G06F 21/62* (2013.01)

(52) U.S. Cl.
CPC ......... *G06K 9/00221* (2013.01); *G09G 3/002* (2013.01); *G09G 5/14* (2013.01); *G09G 5/377* (2013.01); *G06F 2203/04102* (2013.01); *G06K 9/00375* (2013.01); *G09G 2354/00* (2013.01); *G09G 2358/00* (2013.01); *G09G 2380/02* (2013.01)

(58) Field of Classification Search
CPC ..... G09G 2380/02; G06F 3/041; G06F 21/62; G06F 2203/04102; G06K 9/00221; G06K 9/00375
See application file for complete search history.

(56) References Cited

U.S. PATENT DOCUMENTS

| | | | |
|---|---|---|---|
| 8,368,658 | B2 | 2/2013 | Brisebois et al. |
| 8,519,971 | B1 | 8/2013 | Mackraz |
| 10,033,978 | B1 | 7/2018 | Bostick et al. |
| 2004/0032398 | A1 | 2/2004 | Ariel et al. |
| 2008/0204557 | A1 | 8/2008 | Kubota et al. |
| 2009/0086019 | A1 | 4/2009 | Okabe et al. |
| 2009/0189830 | A1* | 7/2009 | Deering ............... H04N 13/383 345/1.3 |
| 2009/0254855 | A1 | 10/2009 | Kretz et al. |
| 2009/0295712 | A1 | 12/2009 | Ritzau et al. |
| 2010/0199232 | A1 | 8/2010 | Mistry et al. |
| 2011/0307842 | A1 | 12/2011 | Chiang et al. |
| 2012/0098765 | A1 | 4/2012 | Soderstrom et al. |
| 2012/0162260 | A1* | 6/2012 | Cudak ............... G06Q 30/0241 345/647 |
| 2013/0024815 | A1 | 1/2013 | O |
| 2013/0154999 | A1 | 6/2013 | Guard |
| 2013/0322785 | A1* | 12/2013 | Kamamori ............. G06T 11/60 382/311 |
| 2014/0055352 | A1 | 2/2014 | Davis et al. |
| 2014/0082514 | A1 | 3/2014 | Sivaraman et al. |
| 2014/0092043 | A1* | 4/2014 | de Leon ............... G06F 3/0488 345/173 |
| 2015/0054730 | A1* | 2/2015 | Kodama ................ G09G 3/001 345/156 |
| 2015/0143276 | A1 | 5/2015 | Luo |
| 2015/0341606 | A1* | 11/2015 | Xu ....................... H04N 9/3173 353/119 |
| 2015/0363038 | A1 | 12/2015 | Luo |
| 2016/0240173 | A1* | 8/2016 | Bostick ................. G09G 3/20 |
| 2017/0199377 | A1* | 7/2017 | Ekambaram ....... G02B 27/0101 |

OTHER PUBLICATIONS

Mazzone et al., "Sketching the Future of the SmartMesh Wide Area Haptic Feedback Device by Introducing the Controlling Concept for such a Deformable Multi-Loop Mechanism", Conference Paper, Publication Date: 2005, IEEE, ETH Zurich, Research Collection, 9 pages.

* cited by examiner

PROJECT CONTENT FROM FLEXIBLE DISPLAY TOUCH DEVICE TO ELIMINATE OBSTRUCTION CREATED BY FINGER

BACKGROUND

The present invention relates generally to the field of display systems, and in particular to detecting and projecting obstructed content over touch screen obstructions.

Touch screens of various configurations have been increasingly utilized in business and private settings. Some devices that typically employ touch screen technology include smart phones, smart watches, laptop computers, tablet computers, desktop computers and smart televisions. Touch screens may be utilized with software allowing users to reformat, drag, and/or drop content displayed on the touch screen using their fingers or a stylus. Some devices have been developed with projected screens and sensors instead of touch pads. Finding ways to enhance a user's experience when interacting with touch screen devices or projected screen devices continues to be a goal of developers.

SUMMARY

In an aspect, a computer-implemented method is provided. The method may include displaying content on a touch screen of the computing device, wherein the touch screen comprises a flexible touch screen display, detecting an obstruction of the content on one or more areas of the touch screen, wherein a user's view of the content is obstructed by the obstruction, determining obstructed content in the one or more areas based on the detected obstruction, and determining a display configuration for a portion of the obstructed content. The method may further include detecting a deformed condition of the touch screen in which the obstruction is positioned within a display angle of the image projection device, rendering display content for concurrent display with unobstructed content of the touch screen, wherein the rendered display content corresponds to the obstructed content, and projecting the rendered display content onto the obstruction for viewing in superposition within a user's field of view.

BRIEF DESCRIPTION OF THE DRAWINGS

The present invention is described in the detailed description which follows, in reference to the noted plurality of drawings by way of non-limiting examples of exemplary embodiments of the present invention.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
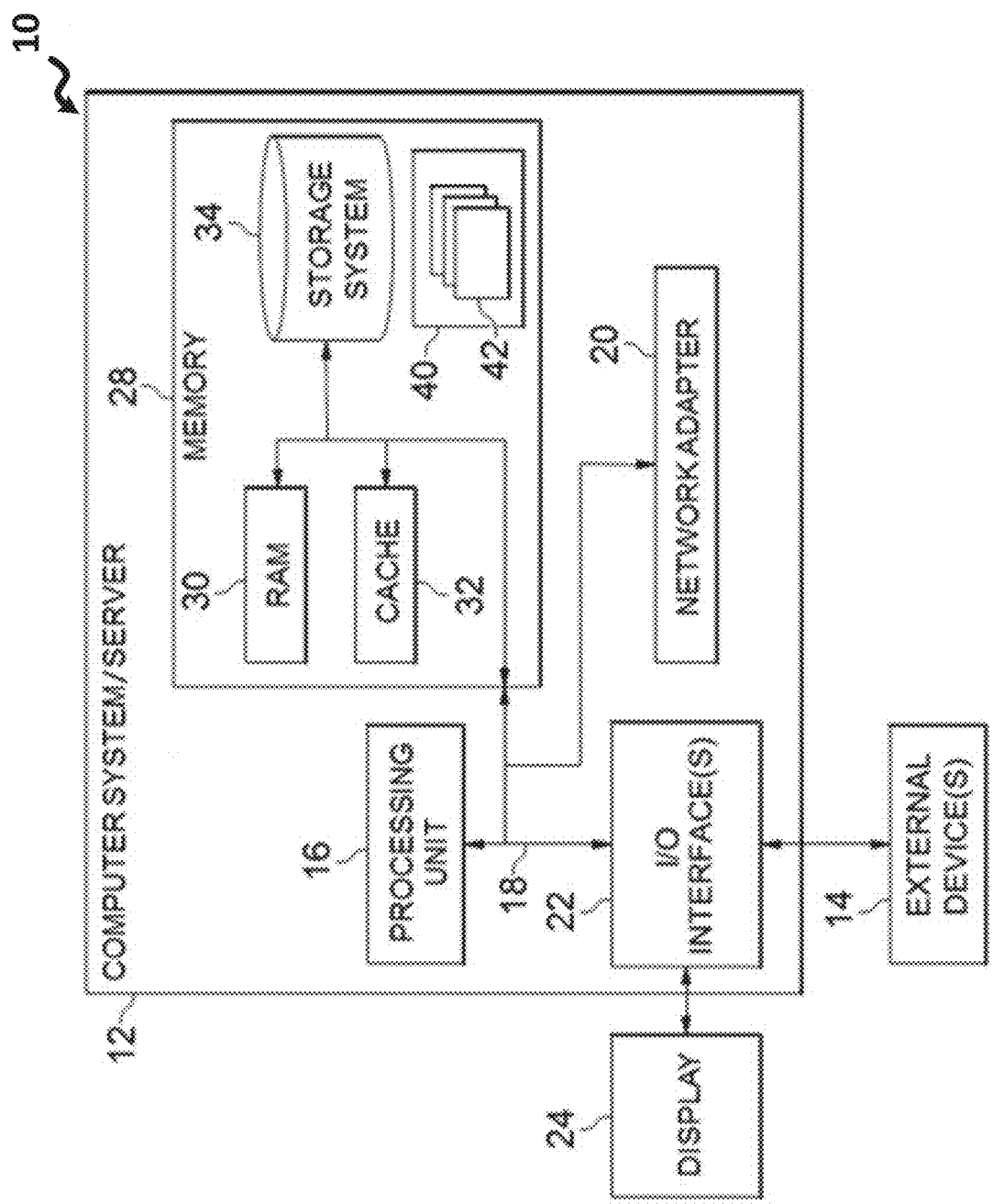
FIG. 1 is a block diagram depicting a computing infrastructure, in accordance with an embodiment of the present invention.

Detailed embodiments of the present invention are disclosed herein for purposes of describing and illustrating claimed structures and methods that may be embodied in various forms, and are not intended to be exhaustive in any way, or limited to the disclosed embodiments. Many modifications and variations will be apparent to those of ordinary skill in the art without departing from the scope and spirit of the disclosed embodiments. The terminology used herein was chosen to best explain the principles of the one or more embodiments, practical applications, or technical improvements over current technologies, or to enable those of ordinary skill in the art to understand the embodiments disclosed herein. As described, details of well-known features and techniques may be omitted to avoid unnecessarily obscuring the embodiments of the present invention.

References in the specification to "one embodiment," "an embodiment," "an example embodiment," or the like, indicate that the embodiment described may include one or more particular features, structures, or characteristics, but it shall be understood that such particular features, structures, or characteristics may or may not be common to each and every disclosed embodiment of the present invention herein. Moreover, such phrases do not necessarily refer to any one particular embodiment per se. As such, when one or more particular features, structures, or characteristics is described in connection with an embodiment, it is submitted that it is within the knowledge of those skilled in the art to affect such one or more features, structures, or characteristics in connection with other embodiments, where applicable, whether or not explicitly described.

Embodiments of the present invention are directed to a method, system, and computer program product for mitigating the effects an obstruction may have on the viewability of content displayed by a touch screen device. The method may include detecting an obstruction of content displayed by a touch screen device, rendering display content for concurrent display with unobstructed content of the touch screen, and projecting the rendered display content onto the obstruction for viewing in superposition with the obstructing object within a user's field of view, in response to a detected deformation of the touch screen. The obstruction may include any obstruction resulting from user interaction with the touch screen device. In various aspects, the touch screen device may include a flexible touch screen display device, a camera, and a projector for projecting the rendered display content on the obstruction. The rendered display content may correspond to the obstructed content.

In various aspects, the method may further include determining a viewing authorization level of a user of the computing device, determining an access-restriction level of the rendered display content, and projecting the display content on the viewing obstruction in response to determining the viewing authorization level of the user exceeds a predetermined threshold, wherein the predetermined threshold corresponds to the access-restriction level. The method may further include determining a viewing authorization level of one or more other users positioned in an environment about the user.

In various aspects, the obstructed display content may be projected on the viewing obstruction for display and viewing by authorization of the user, and one or more other users if present and situated about the user. In the various embodiments, the method may include determining an identity of each of the one or more users (i.e., those situated about the user) to be authorized. In the various embodiments, responsive to determining that an authorization level of one or more of the users does not exceed a predetermined threshold, the method may further include restricting the display of the obstructed display content by limiting projection thereof on the viewing obstruction.

Advantageously, the present invention may be implemented to increase viewability of content displayed by a touch screen device ("data content viewability"), by mitigating the effects one or more obstructions may have on the viewability of the displayed content, as such obstructions may be caused by user interactions with the touch screen device. The user interactions may include, for example, user inputs and gestures such as swipes, taps, and the like. To that end, the present invention may be implemented to improve the viewing robustness of content displayed by the touch screen device, to thereby increase the ergonomics and usability of a device (e.g. mobile phone, tablet, etc.) in which the touch screen device may be integrated.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
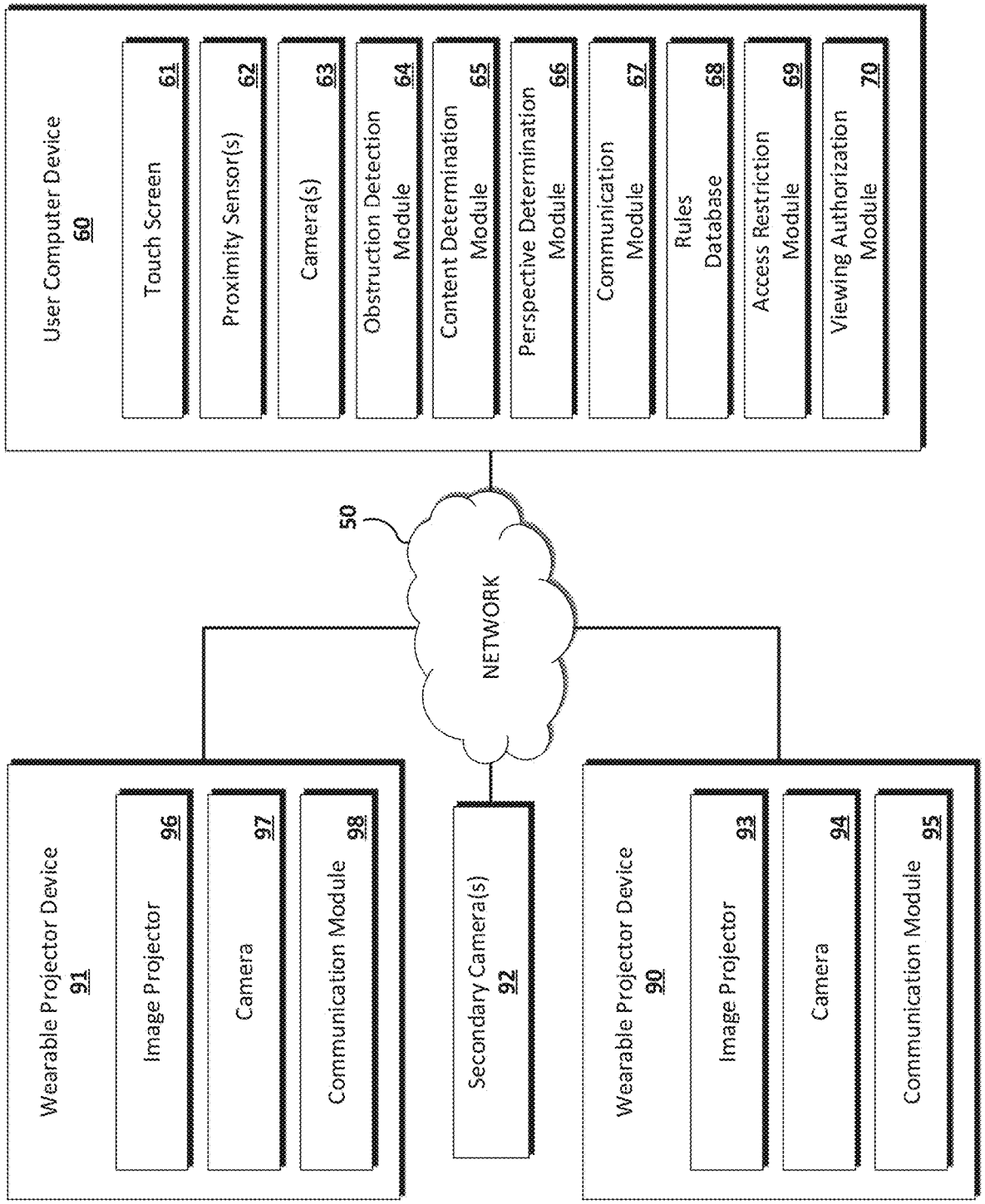
FIG. 2 is a functional block diagram depicting an operating environment of the computing infrastructure, in accordance with an embodiment of the present invention.

FIG. 2 is a functional block diagram depicting an operating environment of the computing infrastructure, in accordance with an embodiment of the present invention. The environment includes user computer device 60 connected to a network 50. The user computer device 60 may comprise a computer system 12, as described with reference to FIG. 1, and may be connected to the network 50 via the network adapter 20 of FIG. 1. The user computer device 60 may be a desktop computer, laptop computer, tablet computer, smartphone, etc. In embodiments, the user computer device 60 includes one or more of the following: touch screen 61, one or more proximity sensors 62, and one or more cameras 63.

In an embodiment, the touch screen 61 may include a flexible touch screen display and a projector. The projector may include a pico projector, a handheld projector, mobile projector, mini beamer, and the like. In an aspect, the projector may be integral with the flexible touch screen display device for adjusting a projection angle of the projector with respect to an area of the touch screen based on a degree of deformation of the flexible display. The flexible display may be deformed or strained by flexure, curvature, bending, bowing, and so on, for locating and positioning the obstruction within the projection angle of the projector, and alternatively or in addition, within a field of view of the camera.

Still referring to FIG. 2, the user computer device 60 may include a number of program modules configured to perform one or more of the functions described herein, such as an obstruction detection module 64, a content determination module 65, a perspective determination module 66, a communication module 67, an access restriction module 69, and a viewing authorization module 70. Each of modules 64-70 may comprise one or more program modules (e.g., program module 42 of FIG. 1) executed by the user computer device 60. In embodiments, the obstruction detection module 64 is configured to detect an obstruction of content displayed on the touch screen 61. In aspects, the content determination module 65 is configured to determine obstructed content in one or more areas, and determine a display configuration for a portion of the obstructed content (i.e., all or some of the obstructed content). In aspects, the content determination module 65 determines a display configuration based on content display rules stored in a rules database 68. In embodiments, the perspective determination module 66 is configured to determine a facial direction of one or more users relative to the touch screen 61. In aspects, the communication module 67 is configured to communicate over the network 50 with one or more wearable projector devices 90, 91 and any secondary cameras 92 utilized in the invention. In aspects, the access restriction module 69 may be configured to evaluate content type obstructed restriction level (ie., public, private, confidential). In aspects, the viewing authorization module 70 may be configured to determine if others in the environment are authorized to view obstructed content, and if so, project obstructed content.

In an embodiment, the one or more wearable projector devices 90, 91 may include for example, a wearable device such as a smart watch, electronic ring, and the like. The wearable device may include, for example, Bluetooth functionality for pairing and communicating with the touch screen 61.

The network 50 may be any suitable communication network or combination of networks, such as a local area network (LAN), a general wide area network (WAN), and/or a public network (e.g., the Internet). In embodiments, the network 50 is a Bluetooth network and the user computer device 60 is in communication with one or more wearable image projectors (represented by the wearable projector devices 90 and 91) via the network 50. In embodiments, the wearable projector device 90 is in the form of a ring, a bracelet, a smartwatch, smart glasses, or other wearable computer device. The wearable projector device 90 may include one or more image projectors 93 (e.g., micro projectors or pico projectors), a camera 94 and a communication module 95. Likewise, the wearable projector device 91 may include one or more image projectors 96 (e.g., micro projector or pico projector), a camera 97 and a communication module 98. In embodiments, each of the communication modules 95 and 98 may comprise one or more program modules executable by respective wearable projector devices 90 and 91, and configured to receive display configuration data from the user computer device 60 (e.g., from communications module 67) via the network 50.

It should be understood that the quantity of devices and/or networks in the environment of FIG. 2 is not limited to what is shown in FIG. 2. In practice, the environment of FIG. 2 may include additional devices and/or networks; fewer devices and/or networks; different devices and/or networks; or differently arranged devices and/or networks.

Figure 3A:
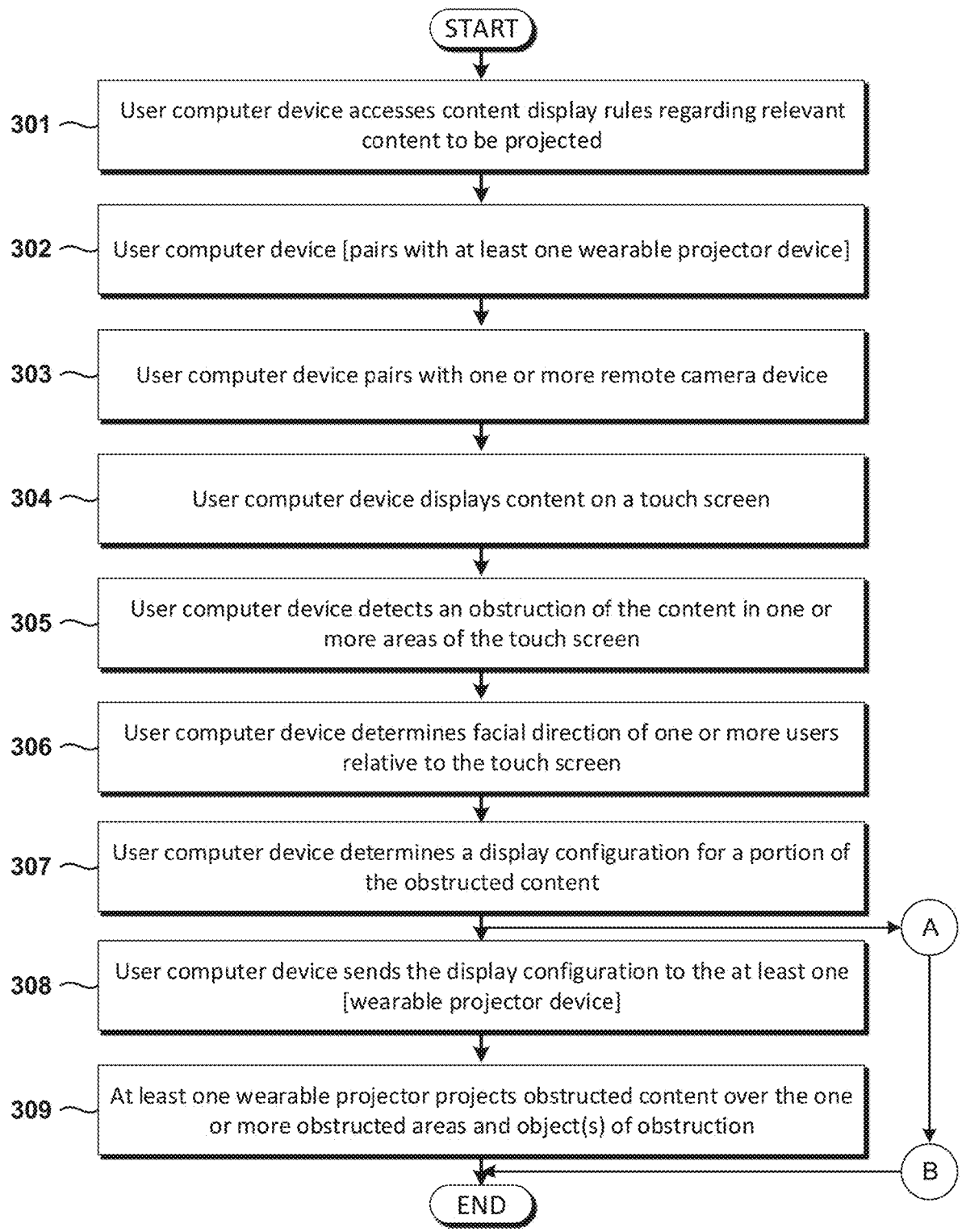
FIG. 3A depicts a flowchart including method steps, in accordance with an embodiment of the present invention.

FIG. 3A depicts a flowchart of steps of a method, in accordance with an embodiment of the present invention. Steps of the method of FIG. 3 may be performed in the environment illustrated in FIG. 2, and are described with reference to elements shown in FIG. 2.

In embodiments, at step 300, the user computer device 60 accesses content display rules regarding relevant content to be projected. In aspects, the content determination module 65 accesses the content display rules stored in the rules database 68 of the user computer device 60. In embodiments, the user computer device receives rules from a remote device (not shown), such as a third party service provider (e.g., support services for the wearable projectors 90, 91) or directly from a user through a user interface of the user computer device 60, and stores the rules in a rules database 68 of the user computer device 60. In aspects, the user computer device 60 presents display rule configuration options or queries to a user, and the user's selection of the option or answers to the query determine the content display rules. In other embodiments, the user computer device accesses content display rules in a remote database (not shown), such as a database of a third party service provider, via the network 55. The content display rules may include rules regarding the type or category of content to be projected by one or more of the wearable projector devices 90, 91. For example, it may not be necessary or desirable to project certain types of content, such as decorative borders or the like. In embodiments, the content display rules comprise rules to only project text-based content.

At step 301, the user computer device 60 pairs with at least one wearable projector device 90, 91. In embodiments, the communication module 67 of the user computer device 60 includes Bluetooth technology to pair with the communication module 95, 98 of one or more wearable projector devices 90, 91. In aspects, the user computer device 60 pairs with the wearable projector device 90 of a first user and the wearable projector device 91 of a second user. Conventional pairing techniques may be utilized in conjunction with step 301.

Optionally, at step 302, the user computer device 60 pairs with one or more remote secondary cameras 92. In embodiments, the communication module 67 of the user computer device 60 includes Bluetooth technology to pair with the one or more secondary cameras 92. The one or more secondary cameras 92 may be cameras on other personal devices of the user (smartphone, smartglasses, laptop camera, etc.). Conventional pairing techniques may be utilized in conjunction with step 302.

At step 303, the user computer device 60 displays content on the touch screen 61. It should be understood that the type and amount of content displayed by the user computer device 60 is not intended to be limited by the present invention. Content may include, for example, text, images, diagrams, symbols, etc. Conventional display techniques may be utilized in conjunction with step 303.

At step 304, the user computer device 60 detects an obstruction of content in one or more areas of the touch screen 61. As used herein, the term obstruction of content means that an obstructing object (e.g., finger, stylus, etc.) is between the touch screen 61 on which content is displayed, and one or more users viewing the content, such that a portion of the content is obstructed from the view of the one or more users. Situations in which a user's interactions with touch screen 61 may create an obstacle to viewing content may include: typing text on the touch screen 61 with a finger/stylus, entering numbers on the touch screen 61 with a finger/stylus, selecting menus with a finger/stylus, or navigating content with a finger/stylus. In embodiments, or more of a plurality of different detection methods are utilized alone or in combination in performing step 304. For example, the user computer device 60 may utilize sensor data received from one or more proximity sensors 62, one or more remote secondary cameras 92, a camera 63 of the user computer device 60, and/or a camera (e.g., 94, 97) of a wearable projector device 90, 91 (e.g., smartglasses) to detect obstruction of the content on the touch screen 61. Other types of sensing devices such as strain gauges, light sensors or other conventional sensing technology (not shown) may be utilized in the performance of step 304. In one example, the obstruction detection module 64 of the user computer device 60 receives sensor data from the proximity sensors 62 and data from the camera 63 to determine that a user's view of content displayed on the touch screen 61 is being obstructed by the user's fingers as they use the touch screen 61. In another example, the obstruction detection module 64 of the user computer device 60 receives sensor data from the proximity sensors 62 and data from the camera 63 to determine that content displayed on the touch screen 61 is being obstructed by a first user's hand as the first user uses the touch screen 61, and simultaneously by a second user's hand as the second user touches the touch screen 61. The manner in which the user computer device 60 detects an obstruction of content on the touch screen 61 is not intended to be limited by the examples given herein.

At step 305, the user computer device 60 detects or determines obstructed content in one or more areas of the touch screen 61 based on the obstruction of the content detected at step 304. In aspects, the obstruction detection module 64 sends data related to the detecting of an obstruction of content in one or more areas of the touch screen 61 (obstruction data) to the content determination module 65, and the content determination module 65 utilizes the obstruction data and data regarding which content is being displayed on the touch screen 61 to determine the amount and type of content that is being obstructed in real time. Various methods of comparing unobstructed content to obstructed content to determine the content that is to be projected may be utilized in conjunction with step 305. In one example, as a user's finger is moved across a touch screen 61 and obscures content on the touch screen 61, the content determination module 65 determines the content that is being obstructed in the particular area of the touch screen 61 obstructed, in real time, utilizing sensor data from the proximity sensors 62 in combination with data regarding the overall content being displayed. In this way, the user computer device 60 can determine the portion of the overall content being displayed that is being obstructed by the users finger. In another example, as both a first user's finger and a second user's finger are moved across different portions of the touch screen 61, the content determination module 65 determines the content that is being obstructed in multiple particular areas of the touch screen 61, in real time. Although discussed as two separate steps, it should be understood that steps 304 and 305 may be performed simultaneously or nearly simultaneously in real time by the user computer device 60.

In embodiments of the invention, at step 306, the user computer device 60 determines a facial direction of each of the one or more users relative to the touch screen 61. As used herein, the term facial direction means an angle at which a user is viewing the content (and any obstruction) on the touch screen 61, or an angle of the viewer with respect to the contact surface of the touch screen 61. In embodiments, the user computer device 60 determines the facial direction of each of the one or more users using data received from the camera 63 of the user computer device 60. For example, in the case where the user computer device 60 is a smartphone, the smartphone's camera 60 may capture image data, which the perspective determination module 66 of the user computer device 60 may utilize to determine the facial direction for each user with respect to the touch screen 61. In aspects, step 306 is performed upon detection of the obstruction of the content at step 304. In an alternative embodiment, step 306 is performed on an ongoing bases, either continuously or periodically. In embodiments, the user computer device 60 also determines the number of users of the user computer device 60 using data received from a camera (e.g., 60, 63). Information regarding the facial direction for one or more users, and the number of users, may be stored in a database of the user computer device 60 or fed directly to the content determination module 65 for use in step 307.

At step 307, the user computer device 60 determines a display configuration for a portion of the obstructed content (some or all of the obstructed content) determined at step 305. In embodiments, the user computer device determines a display configuration for the portion of the obstructed content based on the facial direction of one or more user's determined at step 306. In aspects, the user computer device 60 determines a plurality of display configurations, one for each area of the touch screen 61 that is obstructed (e.g., by first and second users). In embodiments, the user computer device 60 determines the display configuration based in part on content display rules received at step 300. For example, the content display rules may indicate that only text-based data should be projected, in which case the display configuration may call for the reproduction and projection of only obstructed text (e.g., rather than obstructed images and text).

Figure 4:
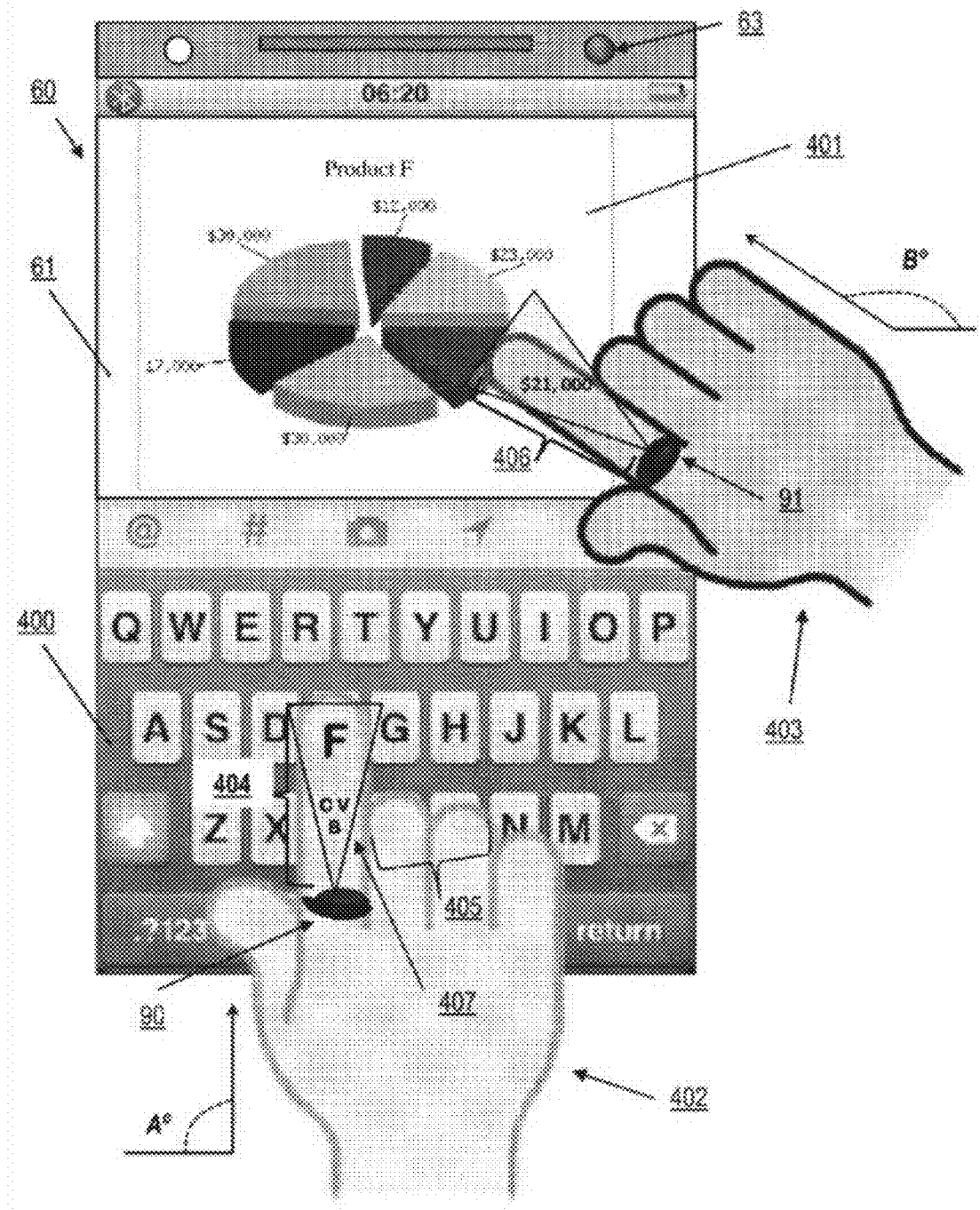
FIG. 4 depicts a first example use case scenario, in accordance with an embodiment of the present invention.

In embodiments, the display configuration is a reproduction of the obstructed content determined at step 305. For example, if a user's finger is blocking the letter "V" on a touch screen keyboard, the display configuration for the obstructed content may be a replication of the letter "V" to be projected over the exact location of the letter "V" underlying the user's finger. In embodiments, the display configuration may be configured to adjust for various limitations of the image projector(s) being utilized (e.g., 93, 96). In aspects, the computer device 60 may determine that an amount of obstructed content cannot be projected by the wearable projector device 90 over at least a portion of an obstructed area, and therefore the determined display configuration includes a reformatted version of the underlying obstructed content. For example, if a user's hand is blocking the letter's "F", "C", "V", and "B", the display configuration may require shrinking the letters "C", "V", and "B" to fit over a particular portion of the obstructed content area, while displaying a replication of the letter "F" over the exact location of the underlying letter "F". This example is depicted in FIG. 4, which is described in more detail below.

Optionally, a plurality of wearable projector devices 90, 91 may be utilized in conjunction with one another (as collaborative devices) to display a desired amount of obstructed content over one or more objects causes the obstructions, in accordance with step 309. In this case, the user computer device 60 configures a plurality of display configurations in accordance with step 307. For example, wearable projector device 90 may be a ring projector with an image projector 93 installed around the circumference of the ring, wherein the image projector 93 has a limited projection range, and may be utilized in conjunction with wearable projector device 91 in the form of smartglasses that have a greater projection range. In such a scenario, the user computer device 60 generates a first display configuration to cause a portion of obstructed content to be projected over an obstructed content area utilizing the ring projector, and generates a second display configuration to cause another portion of the obstructed content to be projected over another obstructed content area utilizing the smartglasses. In embodiments, the user computer device 60 determines that a second user is attempting to view content obscured by the finger of a first user, and adjusts the display configuration such that a projection of a portion of the obstructed content over the first user's finger is from the perspective of the second user.

At step 308, the user computer device 60 sends the display configuration(s) determined at step 307 to at least one wearable projector device 90, 91. In embodiments, the display configuration(s) comprises data defining the manner in which a portion of the obstructed content determined at step 305 is to be projected over one or more areas of the touch screen 61. In aspects, the communication module 67 of the user computer device 60 sends the display configuration to the communication module 95, 98 of one or more wearable projector devices 90, 91.

At step 309, the one or more image projectors 93, 96 of the at least one wearable projector device 90, 91 project obstructed content over the one or more obstructed areas of the touch screen 61 and the object(s) of obstruction (e.g., first and second user's fingers). In embodiments, content projected over a finger of a user by the one or more image projectors 93, 96 changes dynamically based on movement of the finger around the content displayed on the touch screen 61, facial direction alignment of the user, and change in content on the display device. In embodiments, the one or more image projectors 93, 96 project obstructed content over multiple obstructed areas of the touch screen 61 in real time. In aspects, the one or more image projectors 93 and 96 are micro or pico projectors. It should be understood that different micro or pico projectors may be utilized in accordance with the method of FIG. 3. In aspects, the image projector 93, 96 is part of a ring, smartwatch, smartglasses or other smart wearable device that projects obstructed content over one or more obstructed areas of the touch screen 61 (and the objects obstructing the content) in accordance with the display configuration received from the user computer device 60. Advantageously, only obstructed content is projected over the one or more objects obstructing the content, as opposed to conventional projectors that project entire packages of content onto a screen or other object for viewing by a user.

Figure 3B:
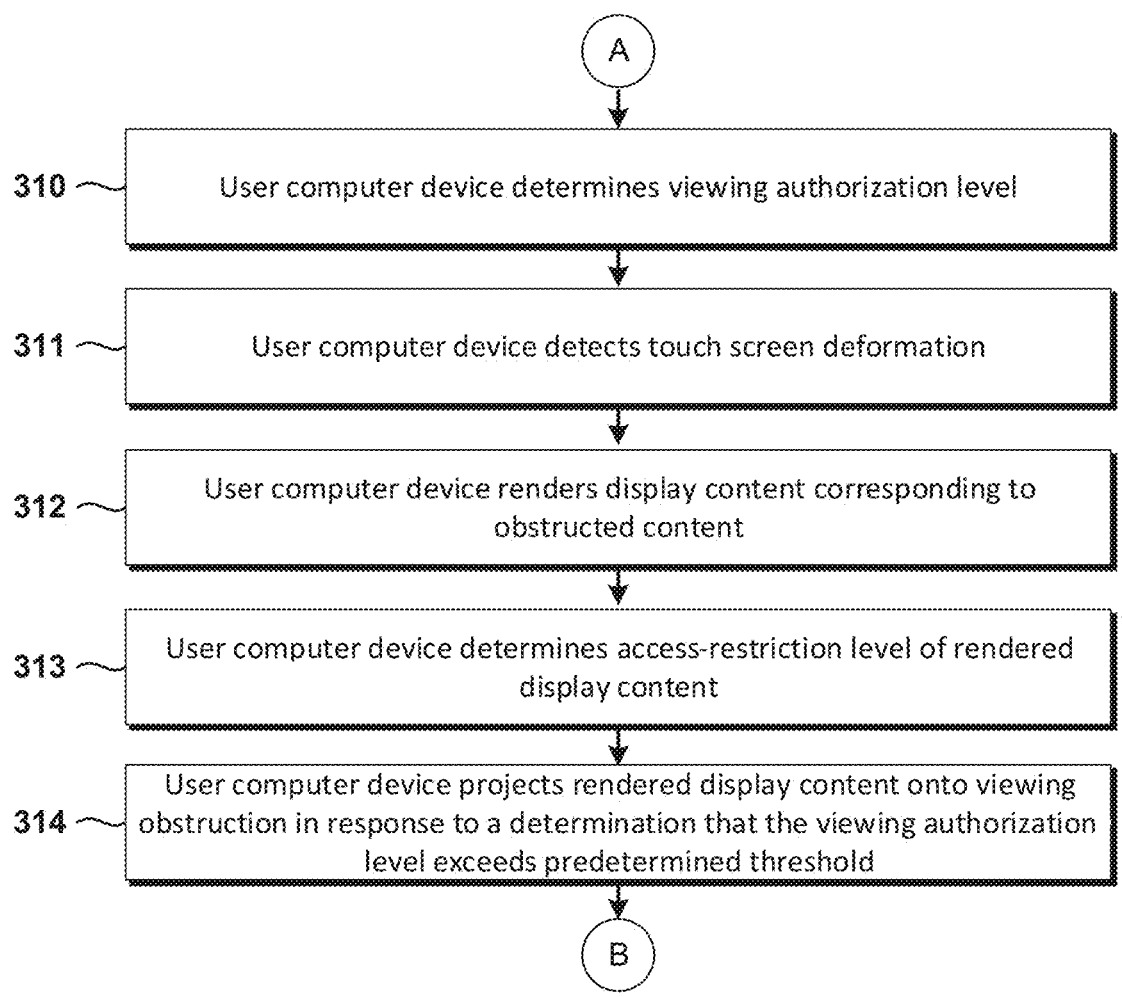
FIG. 3B depicts a flowchart including method steps, in accordance with an embodiment of the present invention.

FIG. 3B depicts a flowchart including method steps, in accordance with an embodiment of the present invention. Steps of the method of FIG. 3B may be performed in the environment illustrated in FIG. 2, and are described with reference to elements shown in FIG. 2.

At step 310, the user computer device 60 determines a viewing authorization level of the user. In an embodiment, determining the viewing authorization level may include, for example, capturing a facial image of the user for determining authorization of the user to view restricted content. In the embodiment, determining the viewing authorization level may further include, for example, mapping authorized user (s) to content level restrictions of the restricted content. In an embodiment, a predetermined threshold may be specified based on an occurrence of a detected obstruction exceeding, for example, 5 seconds in duration.

In an embodiment, the user computer device 60 may implement a user authorization method such as user ID/password, finger print reader, facial recognition, and the like. Any authorization method may be implemented to authorize the user, in accordance with embodiments of the present invention. In the embodiment, an authorization method may be implemented based on user preferences. For example, a user preference may define a projection delay period to control and delay projection based on the occurrence of obstructed content of the touch screen.

In an embodiment, the user computer device 60 may implement a user authorization method in which one or more individuals, such as other users, are positioned in an environment about the user. For example, the individuals may be observed and identified based on images captured by cameras such as camera 63, 97, and/or 94. If an individual is unable to be identified, they will be considered unauthorized. The content obstructed in this case would remain obstructed. If the individual is able to be identified, such as by way of facial recognition, then the mapping of content access level will be loaded. If the user is identified and authorized in cases the content is restricted, then the obstructed content could be projected.

At step 311, the user computer device 60 may detect a deformed condition of the touch screen. In an embodiment, the deformed condition may include, for example, flexure, curvature, bending, and/or bowing of the touch screen about an axis, material strain in a region of the touch screen, and the like. In the embodiment, the deformed condition of the touch screen may include, for example, bending, bowing, or arching of the touch screen about an axis parallel to a display plane of the touch screen, such as depicted and described with reference to FIG. 5B, below. In the embodiment, detecting the deformed condition may include detecting a deformation of the touch screen in which the obstruction is positioned within a display angle of the image projection device ("projector"), wherein the obstruction is positioned within the display angle based on the deformation. In the embodiment, the image projection device may include, for example, a pico-projector, a handheld projector, a mobile projector, and the like. The deformed condition of the touch screen may otherwise include any relative displacement between portions of the touch screen, in accordance with embodiments of the present invention. In the embodiment, the deformed condition may be detected by one or more piezoelectric sensors connected to the touch screen. The deformed condition of the touch screen may otherwise be detected using any deformation technique, in accordance with embodiments of the present invention.

For purposes of the present disclosure, the display angle of the projector refers to the projection angle through which the projector can effectively project an image onto a surface for viewing of the projected image (e.g. by a user via reflection of the image from the surface). In an embodiment, the surface may include a surface of the obstruction. For example, the display angle of the projector may be used to define or determine a relative orientation between the projector and a surface of the obstruction by which an image may be coherently projected from the projector onto the surface, for clear and coherent viewing of the image by the user.

At step 312, the user computer device 60 renders display content for concurrent display with unobstructed content of the touch screen. The unobstructed content may include, for example, viewable or otherwise unblocked (i.e. unobstructed) content that is displayed by the touchscreen, as may be seen from the user's point of view. That is, the user may plainly view the unobstructed content with an unbroken (i.e. unobstructed) line of sight, as such content may be displayed by the touch screen.

In an embodiment, the rendered display content may correspond to the obstructed content. The rendered display content may include, for example, an image of the obstructed content or any other visual representation of the obstructed content, in accordance with embodiments of the present invention. For example, upon detecting the deformation of the touch screen at step 311, the user computer device 60 may render the display content for concurrent display with the unobstructed content of the touch screen, as described with reference to FIG. 5B, below.

At step 313, the user computer device 60 detects or determines obstructed content in one or more areas of the touch screen 61, such as described with reference to step 305. In an embodiment, the content may be obstructed by the user's finger or hand, a stylus, or the like. The obstruction may otherwise include any other obstruction resulting from user interaction with the touch screen device, in accordance with embodiments of the present invention.

For example, a user may place a hand, finger, or stylus on a touch screen device such as the touch screen 61 in interacting with the device, such as to type on a displayed keyboard, provide an input to a displayed user interface control element such as a menu item, or select or point to a displayed object. In interacting with the device, the hand, finger, or stylus used to interface with the device may obstruct the user's view (i.e., line of sight) of the displayed content.

As another example, if the user uses a wearable device to interact with the device, the user may seek to intentionally obstruct the view of the displayed content. In an embodiment, a viewing parameter may be defined to enable obstruction of a specific user-selected type of displayed content, regardless of a content restriction level of the user-selected type of displayed content. In the example, after the viewing parameter has been defined, when the user uses the wearable device to interact with the device, the user-selected type of displayed content will automatically be obstructed, or otherwise, not be projected.

At step 314, the user computer device 60 projects the rendered display content onto the obstruction for viewing in superposition within a user's field of view. For example, one or more cameras such as camera 63, 97, and/or 94 may capture an image of the obstruction. Sensors built-in to the display can detect the area of the obstruction. Any image rendering technique may be implemented, in accordance with embodiments of the present invention.

In an embodiment, the rendered display content may be projected on a viewing obstruction in response to determining that the viewing authorization level of the user exceeds a predetermined threshold. The predetermined threshold may correspond to an access-restriction level of the user, such as determined at step 310.

In an embodiment, determining whether the viewing authorization level exceeds the predetermined threshold may include, for example, determining a viewing authorization level of a user of the computing device, determining an access-restriction level of the rendered display content, and projecting the display content at the viewing obstruction in response to determining the viewing authorization level of the user exceeds a predetermined threshold, wherein the predetermined threshold corresponds to the access-restriction level. The method may further include determining a viewing authorization level of one or more other users positioned in an environment about the user.

In an embodiment, determining the access-restriction level of the rendered display content may include, for example, defining an access restriction level of the content with respect to a public, personal, or confidential display or viewing status of the content. For example, at runtime when content is accessed for subsequent display, metadata associated with the content may be read to determine the access restriction level of the content, so as to obstruct viewability or otherwise prevent projection of the content according to the access restriction level of the content. That is, if the access restriction level is public, the content may be displayed without restriction, and if the access restriction level is personal or confidential, the display of the content may be restricted by obstruction or prevention of projection, accordingly.

FIG. 4 depicts a first example use case scenario, in accordance with an embodiment of the present invention. In the scenario of FIG. 4, the user computer device 60 is in the form of a mobile device including the touch screen 61 and the camera 63. Steps of the scenario of FIG. 4 may be performed in the environment illustrated in FIG. 2 and in conjunction with the method of FIG. 3A.

As depicted, the touch screen 61 is configured to display content, which is shown in this example as a touch screen keyboard 400 and a chart 401 for "Product F". A first user indicated at 402 utilizes the wearable projector device 90 in the form of a ring projector. A second user indicated at 403 utilizes the wearable projector device 91 in the form of a ring projector. Initially, the user computer device 60 pairs with both wearable projector devices 90 and 91 (e.g., through Bluetooth) in accordance with step 301 of FIG. 3A. The user computer device 60 also displays content (400 and 401) on the touch screen 61 in accordance with step 303 of FIG. 3A. The user computer device 60 detects an obstruction of content in multiple areas of the touch screen 61 generally represented at 404-406, utilizing internal proximity sensors 62 (not shown in FIG. 4), in accordance with step 304 of FIG. 3A. The user computer device 60 then determines obstructed content in the areas 404, 405 and 406 in accordance with step 305 of FIG. 3A.

In the scenario of FIG. 4, the user computer device 60 determines that the hand of the first user 402 is obstructing portions of the touch screen keyboard 400, including the letters "F", "C", "V" and "B" at areas 404 and 405. The user computer device 60 also determines that the hand of the second user 403 is obstructing portions of the chart 401, including the text "$21,000" at area 406. The user computer device 60 also determines a respective facial direction of each of the first and second users 402 and 403 utilizing the camera 63, in accordance with step 306 of FIG. 3A. In this scenario, the user computer device 60 determines that the first user 402 is viewing the touch screen 61 at a first angle represented at A°, and that the second user 403 is viewing the touch screen 61 at a second angle represented at B°.

The user computer device 60 then determines the display configuration for obscured content in the areas 404 and 405, and the display configuration for the obscured content in the separate area 406, in accordance with step 307 of FIG. 4. In the scenario of FIG. 4, the content display rules stored in the user computer device 60 (received in accordance with step 300 of FIG. 3A) limit the content to be displayed to text-based content, such that decorative borders and graphics are not to be projected by wearable projector devices 90 and 91 in communication with the user computer device 60. Thus, the user computer device 60 determines the respective display configurations for obscured text-based content in the areas 404, 405 and 406 of the touch screen 61. Moreover, the user computer device 60 determines the respective display configurations based on the facial directions of the first and second users 402 and 403. The user computer device 60 then sends the display configurations to respective wearable projector devices 90 and 91 in accordance with step 308 of FIG. 3.

Still referencing FIG. 4, the wearable projector device 90 receives the display configuration and projects obstructed content onto the finger of the first user 402 using the image projector 93 (not separately labeled in FIG. 4). In this scenario, the projected content includes the letters "F", "C", "V", and "B". Additionally, in this scenario, the user computer device 60 determines that a portion of the obstructed content ("V" and "B") cannot be projected by the wearable projector device 90 over an area 405. Accordingly, the user computer device 60 determined that the display configuration includes letter "C", "V", and "B" shrunk and repositioned on an available projector display area represented at 407. Thus, based on the display configuration determined by the user computer device 60, the wearable projector device 90 projects the obstructed content "F", "C", "V", and "B" in a format that enables the user to understand the text-based content that is obstructed by their hand. Similarly, the wearable projector device 91 receives the display configuration and projects obstructed content onto the finger of the second user 403 using the image projector 96 (not separately labeled in FIG. 4). In this scenario, the projected content includes the text "$21,000", which is obscured by the finger of the second user 403. Thus, it can be understood that a portion of the obstructed content (the text-based content "F", "C", "V", and "B") is displayed over a finger (finger of first user 402) causing the obstruction of the content, while another portion of obstructed content (the text-based content "$21,000") is displayed over a finger (finger of second user 403) causing the obstruction of another portion of content.

Advantageously, embodiments of the invention enable the projection of only obstructed content (rather than large amounts of projected content) over the top surface of one or more objects (e.g., user's finger or stylus) obstructing the view of a touch screen. In this way, aspects of the invention enable uninterrupted interaction with the touch screen, in single user or multi-user scenarios.

In embodiments, a service provider could offer to perform the processes described herein. In this case, the service provider can create, maintain, deploy, support, etc., the computer infrastructure that performs the process steps of the invention for one or more customers. These customers may be, for example, any business that uses touch screen technology. In return, the service provider can receive payment from the customer(s) under a subscription and/or fee agreement and/or the service provider can receive payment from the sale of advertising content to one or more third parties.

In still another embodiment, the invention provides a computer-implemented method for detecting and projecting obstructed content over touch screen obstructions. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Figure 5A:
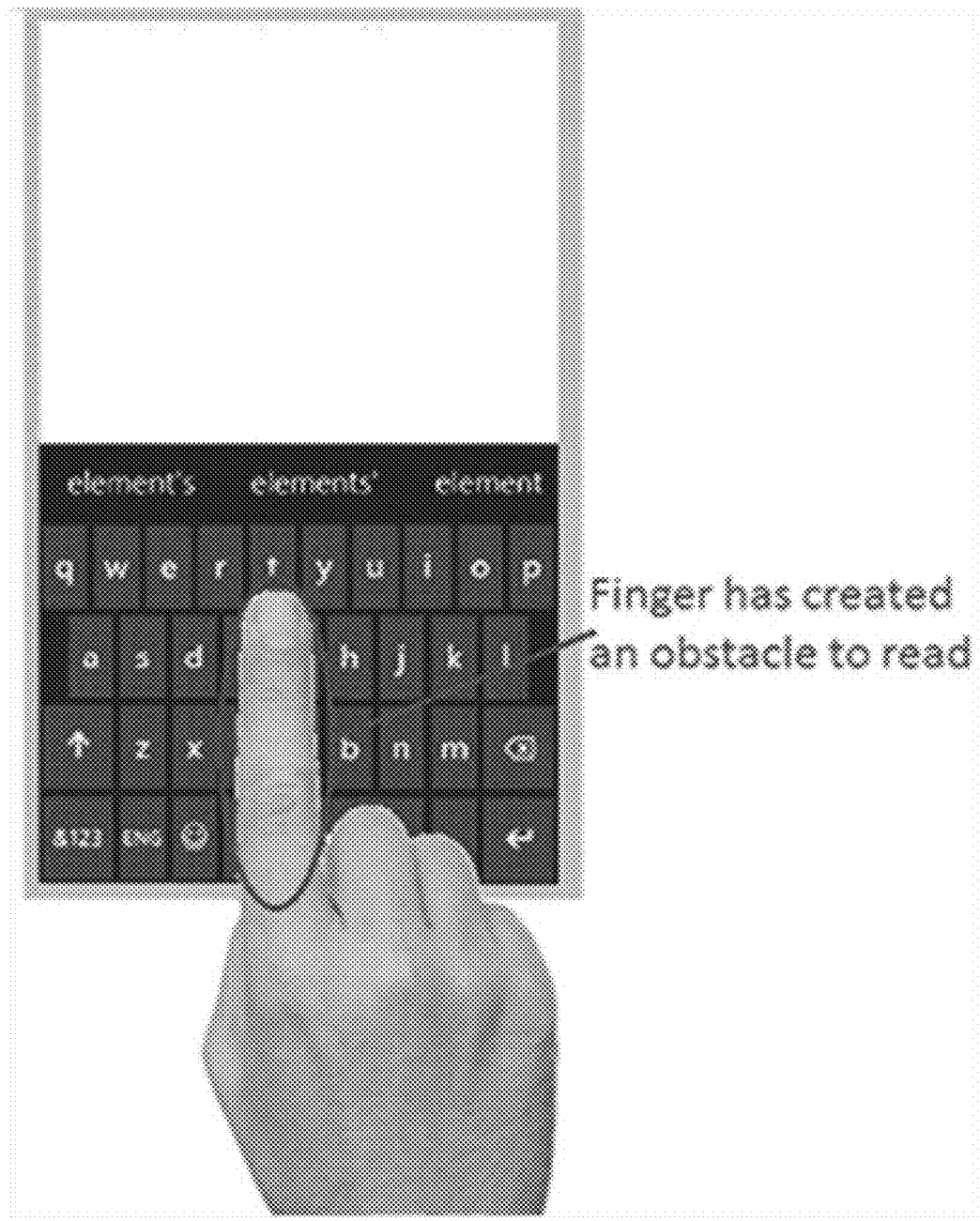
FIG. 5A depicts a second example use case scenario, in accordance with an embodiment of the present invention.

FIG. 5A depicts a second example use case scenario, in accordance with an embodiment of the present invention. As depicted in FIG. 5A, an obstruction may be caused by the user's finger or hand, a stylus, or the like. As such, the user can not view the portion of the displayed keyboard blocked by the obstruction.

Figure 5B:
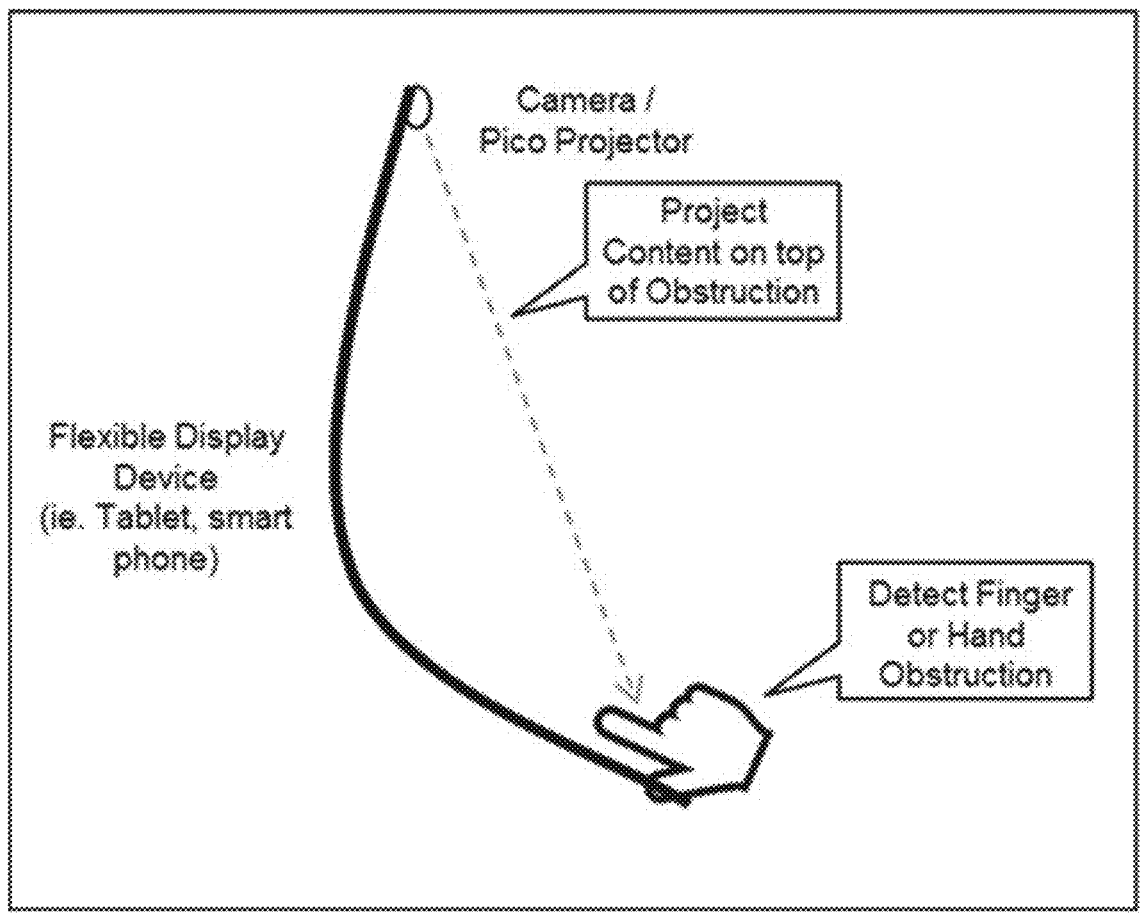
FIG. 5B depicts the second example use case scenario, in accordance with an embodiment of the present invention.

FIG. 5B depicts the second example use case scenario, in accordance with an embodiment of the present invention. As depicted, a side-view of the touch screen in a deformed condition is shown. In an embodiment, the user computer device 60 may detect a deformed condition of the touch screen. In the embodiment, the deformed condition may include, for example, flexure, curvature, bending, and/or bowing of the touch screen about an axis, material strain in a region of the touch screen, and the like, as previously described. In the embodiment, the deformed condition may otherwise include a condition in which an unobstructed line of sight is produced between the camera or pico projector and a user-facing surface of the obstruction. The unobstructed line of sight may enable unobstructed projection of display content on the obstruction. For example, as depicted in FIG. 5B, the deformed condition may include a condition in which the touch screen is bowed about an axis oriented parallel to an area of the touch screen, such that an unobstructed line of sight is produced between the camera/pico projector and an obstruction positioned over the touch screen (e.g. the finger or hand, as depicted in FIG. 5B).

In an embodiment, the pico projector may project display content on the obstruction based on an orientation or effective display angle of the pico projector with respect to the obstruction and a viewing angle of the user. In the embodiment, the orientation of the pico projector may be determined based on a degree of deformation corresponding to a detected deformed condition of the touch screen. The degree of deformation may correspond to a degree of relative displacement between areas of the touch screen, such as those areas of the touch screen adjacent to the pico projector and the obstruction, respectively. The degree of deformation may be determined, for example, based on data output by a piezoelectric sensor connected to the touch screen, image data output by one or more of the cameras 63, and the like. Generally, any data processing method may be implemented in determining the degree of deformation, in accordance with embodiments of the present invention.

As an example, in a first deformed condition of the touch screen where the pico projector is oriented with respect to the obstruction such that an unobstructed line of sight between the pico projector and the obstruction exists, such as depicted in FIG. 5B, a corresponding degree of deformation of the touch screen may be determined for projecting the display content on the obstruction based on the orientation of the pico projector with respect to the obstruction in the first deformed condition of the touch screen. The display content may be projected so as to substantially resemble the underlying display content obstructed by the obstruction in the first deformed condition. Subsequently, as the deformed condition of the touch screen moves from away from the first condition to a second, distinct deformed condition, a corresponding degree of deformation of the touch screen may be determined for adjusting the projection of the display content on the obstruction accordingly, so as to maintain the substantial resemblance of the projected display content with that of the underlying display content, as obstructed by the obstruction in the second deformed condition. In other words, as the orientation of the pico projector varies with the deformation of the touch screen, the projection of the display content may be adjusted accordingly, to account for changes in the curvature of the touch screen, the contours of the obstruction, and so on, to enable and maintain the substantial similarity of the projected display content with the display content obstructed by the obstruction.

Figure 5C:
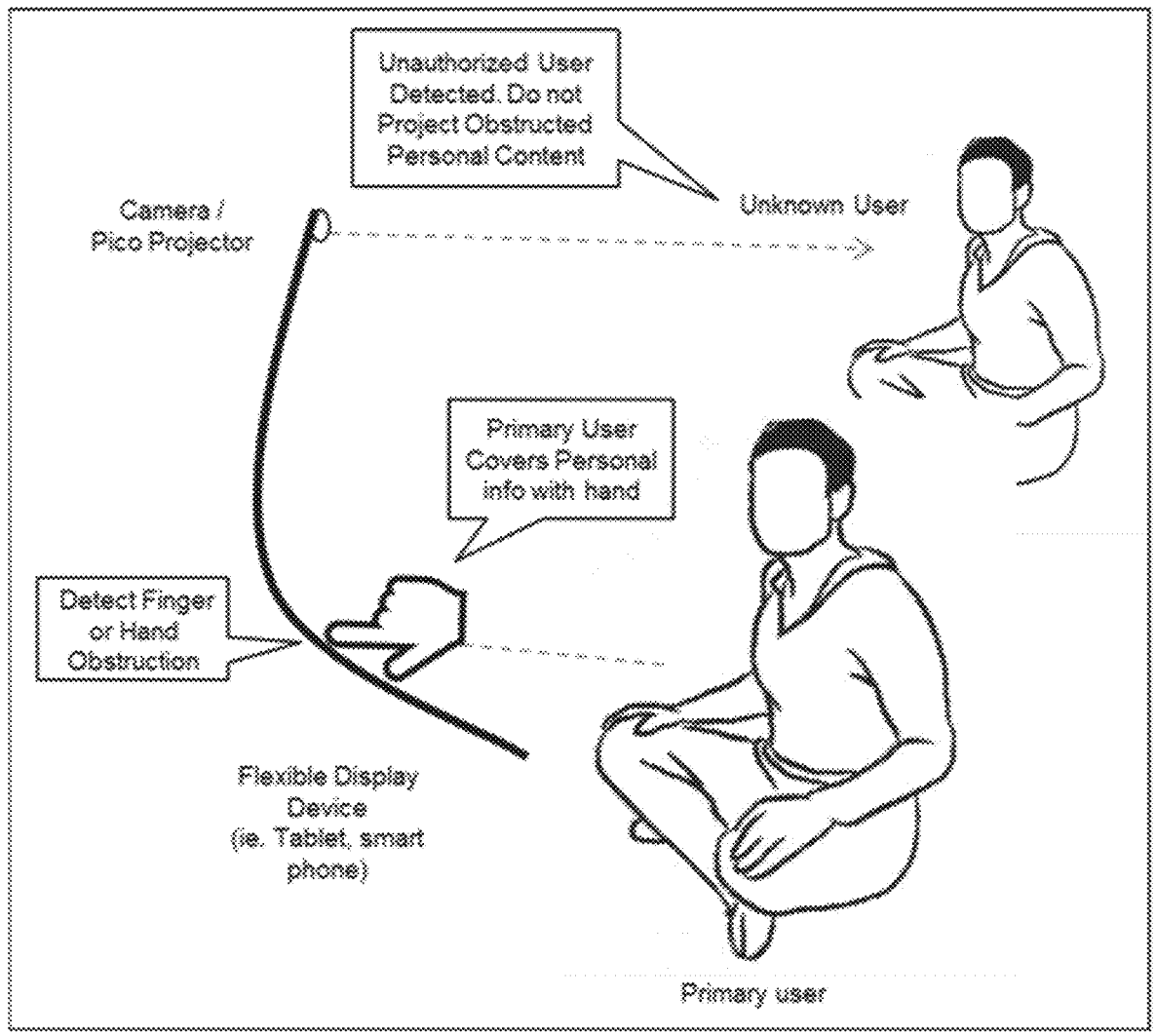
FIG. 5C depicts the second example use case scenario, in accordance with an embodiment of the present invention.

FIG. 5C depicts the second example use case scenario, in accordance with an embodiment of the present invention. As depicted in FIG. 5C, the user computer device 60 may determine a viewing authorization level of one or more other users positioned in an environment about the user, as described with reference to step 310.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the present invention has been disclosed by way of example for purposes of illustration, and not limitation, to best explain the principles of the embodiments, and to enable others of ordinary skill in the art to understand the embodiments disclosed herein.

What is claimed is:

1. A computer-implemented method, comprising:
    displaying content on a touch screen of the computing device in an original overall arrangement, wherein the touch screen comprises a flexible touch screen display;
    detecting an obstruction of a portion of the content on one or more areas of the touch screen, wherein a user's view of the portion of the content is obstructed by the obstruction;
    determining obstructed content in the one or more areas based on the detected obstruction, the obstructed content having items of the content that are obstructed;
    determining a display configuration for a portion of the obstructed content, the items being located in respective original positions in an original sub-arrangement of the original overall arrangement;
    detecting a deformed condition of the touch screen in which the obstruction is positioned within a display angle of an image projection device;
    rendering display content for concurrent display with unobstructed content of the touch screen, wherein the rendered display content corresponds to the obstructed content, the rendered display content including the items that are located in respective rendered positions corresponding to the original positions in the original sub-arrangement of the items;
    determining a portion of the obstruction covering the obstructed content on which to show the rendered display content; and
    projecting the rendered display content onto the portion of the obstruction that is positioned over the obstructed content for viewing in superposition within a user's field of view, wherein the rendered display content and the unobstructed content are configured such that the content is shown substantially similar to the original overall arrangement as if the obstruction is absent.

2. The computer-implemented method of claim 1, further comprising:
    determining a viewing authorization level of the user; and
    in response to determining the viewing authorization level of the user exceeds a predetermined threshold:
        projecting the display content on the viewing obstruction.

3. The computer-implemented method of claim 2, wherein determining a viewing authorization level of the user further comprises:
    determining a viewing authorization level of one or more other users positioned in an environment about the user.

4. The computer-implemented method of claim 2, wherein the predetermined threshold corresponds to an access-restriction level of the rendered display content.

5. The computer-implemented method of claim 1, wherein the deformed condition of the touch screen comprises bending of the touch screen about an axis oriented parallel to a display plane of the touch screen.

6. The computer-implemented method of claim 1, wherein the image projection device comprises a pico projector.

7. The computer-implemented method of claim 2, wherein determining a viewing authorization level of the user further comprises:
    capturing a facial image of the user.

8. A computer system, comprising:
    one or more computer processors, one or more computer-readable storage media, and program instructions stored on one or more of the computer-readable storage media for execution by at least one of the one or more computer processors, the program instructions, when executed by the at least one of the one or more computer processors, causing the computer system to perform a method comprising:
    displaying content on a touch screen of the computing device in an original overall arrangement, wherein the touch screen comprises a flexible touch screen display;
    detecting an obstruction of a portion of the content on one or more areas of the touch screen, wherein a user's view of the portion of the content is obstructed by the obstruction;
    determining obstructed content in the one or more areas based on the detected obstruction, the obstructed content having items of the content that are obstructed;
    determining a display configuration for a portion of the obstructed content, the items being located in respective original positions in an original sub-arrangement of the original overall arrangement;
    detecting a deformed condition of the touch screen in which the obstruction is positioned within a display angle of an image projection device;
    rendering display content for concurrent display with unobstructed content of the touch screen, wherein the rendered display content corresponds to the obstructed content, the rendered display content including the items that are located in respective rendered positions corresponding to the original positions in the original sub-arrangement of the items;

determining a portion of the obstruction covering the obstructed content on which to show the rendered display content; and projecting the rendered display content onto the portion of the obstruction that is positioned over the obstructed content for viewing in superposition within a user's field of view, wherein the rendered display content and the unobstructed content are configured such that the content is shown substantially similar to the original overall arrangement as if the obstruction is absent.

9. The computer system of claim 8, the method further comprising:

determining a viewing authorization level of the user; and in response to determining the viewing authorization level of the user exceeds a predetermined threshold:

projecting the display content on the viewing obstruction.

10. The computer system of claim 9, wherein determining a viewing authorization level of the user further comprises:

determining a viewing authorization level of one or more other users positioned in an environment about the user.

11. The computer system of claim 9, wherein the predetermined threshold corresponds to an access-restriction level of the rendered display content.

12. The computer system of claim 8, wherein the deformed condition of the touch screen comprises bending of the touch screen about an axis oriented parallel to a display plane of the touch screen.

13. The computer system of claim 8, wherein the image projection device comprises a pico projector.

14. A computer program product, comprising:

one or more computer-readable storage devices and program instructions stored on at least one of the one or more computer-readable storage devices for execution by at least one or more computer processors of a computer system, the program instructions, when executed by the at least one of the one or more computer processors, causing the computer system to perform a method comprising:

displaying content on a touch screen of the computing device in an original overall arrangement, wherein the touch screen comprises a flexible touch screen display;

detecting an obstruction of a portion of the content on one or more areas of the touch screen, wherein a user's view of the portion of the content is obstructed by the obstruction;

determining obstructed content in the one or more areas based on the detected obstruction, the obstructed content having items of the content that are obstructed;

determining a display configuration for a portion of the obstructed content, the items being located in respective original positions in an original sub-arrangement of the original overall arrangement;

detecting a deformed condition of the touch screen in which the obstruction is positioned within a display angle of an image projection device;

rendering display content for concurrent display with unobstructed content of the touch screen, wherein the rendered display content corresponds to the obstructed content, the rendered display content including the items that are located in respective rendered positions corresponding to the original positions in the original sub-arrangement of the items;

determining a portion of the obstruction covering the obstructed content on which to show the rendered display content; and projecting the rendered display content onto the portion of the obstruction that is positioned over the obstructed content for viewing in superposition within a user's field of view, wherein the rendered display content and the unobstructed content are configured such that the content is shown substantially similar to the original overall arrangement as if the obstruction is absent.

15. The computer program product of claim 14, the method further comprising:

determining a viewing authorization level of the user; and in response to determining the viewing authorization level of the user exceeds a predetermined threshold:

projecting the display content on the viewing obstruction.

16. The computer program product of claim 15, wherein determining a viewing authorization level of the user further comprises:

determining a viewing authorization level of one or more other users positioned in an environment about the user.

17. The computer program product of claim 15, wherein the predetermined threshold corresponds to an access-restriction level of the rendered display content.

18. The computer program product of claim 14, wherein the deformed condition of the touch screen comprises bending of the touch screen about an axis oriented parallel to a display plane of the touch screen.

19. The computer program product of claim 14, wherein the image projection device comprises a pico projector.

20. The computer program product of claim 15, wherein determining a viewing authorization level of the user further comprises:

capturing a facial image of the user.

* * * * *